US012811038B2

(12) United States Patent
Suzuki et al.

(10) Patent No.: US 12,811,038 B2
(45) Date of Patent: Nov. 24, 2026

(54) PERMANENT MAGNET AND METHOD FOR MANUFACTURING THE SAME

(71) Applicant: TOKIN Corporation, Shiroishi (JP)

(72) Inventors: Noriyoshi Suzuki, Shiroishi (JP); Fumio Tanaka, Shiroishi (JP)

(73) Assignee: TOKIN CORPORATION, Shiroishi (JP)

( * ) Notice: Subject to any disclaimer, the term of this patent is extended or adjusted under 35 U.S.C. 154(b) by 58 days.

(21) Appl. No.: 17/810,200

(22) Filed: Jun. 30, 2022

(65) Prior Publication Data

US 2023/0019328 A1 Jan. 19, 2023

(30) Foreign Application Priority Data

Jul. 1, 2021 (JP) ................................ 2021-110005

(51) Int. Cl.

| | |
|---|---|
| ***H01F 1/055*** | (2006.01) |
| ***B22F 3/16*** | (2006.01) |
| ***B22F 3/24*** | (2006.01) |
| ***B22F 9/04*** | (2006.01) |
| ***C22C 19/07*** | (2006.01) |
| ***C22C 30/02*** | (2006.01) |

(Continued)

(52) U.S. Cl.

CPC .............. *H01F 1/0551* (2013.01); *B22F 3/16* (2013.01); *B22F 3/24* (2013.01); *B22F 9/04* (2013.01); *C22C 19/07* (2013.01); *C22C 30/02* (2013.01); *C22F 1/10* (2013.01); *H01F 41/0266* (2013.01); *B22F 2003/248* (2013.01); *C22C 2202/02* (2013.01)

(58) Field of Classification Search

None

See application file for complete search history.

(56) References Cited

U.S. PATENT DOCUMENTS

2015/0262740 A1 9/2015 Fujiwara et al.
2015/0380134 A1 12/2015 Machida et al.

(Continued)

FOREIGN PATENT DOCUMENTS

CN 112582121 A * 3/2021 ................ B22F 3/04
CN 112750587 A * 5/2021 ........... H01F 1/0557

(Continued)

OTHER PUBLICATIONS

Machine translation of CN 112582121A. Mar. 30, 2021. (Year: 2021).*

(Continued)

*Primary Examiner* — Xiaowei Su
(74) *Attorney, Agent, or Firm* — McCoy Russell LLP

(57) ABSTRACT

A permanent magnet in which demagnetization adjustment can be easily performed and a method for manufacturing the same are provided. The permanent magnet contains 22 to 28 mass % of a rare-earth element R, 12 to 23 mass % of Fe, 3 to 9 mass % of Cu, 1 to 4 mass % of Zr, and a remainder consisting of Co and unavoidable impurities, in which, in a demagnetization curve in which the horizontal axis indicates a demagnetization field (kOe) and the vertical axis indicates the total amount of magnetic flux ($\times 10^{-5}$ WbT) in the permanent magnet, the slope of an approximate straight line in demagnetization field ranges from 0 to −11 kOe is 1.2 or smaller.

5 Claims, 4 Drawing Sheets

(51) Int. Cl.

| | |
|---|---|
| ***C22F 1/10*** | (2006.01) |
| ***H01F 41/02*** | (2006.01) |

(56) References Cited

U.S. PATENT DOCUMENTS

| | | | |
|---|---|---|---|
| 2018/0144850 | A1 | 5/2018 | Okamoto et al. |
| 2020/0243232 | A1 | 7/2020 | Takezawa et al. |

FOREIGN PATENT DOCUMENTS

| | | | |
|---|---|---|---|
| JP | H1070023 | A | 3/1998 |
| JP | 2002083728 | A | 3/2002 |
| JP | 2015188072 | A | 10/2015 |
| JP | 2018085388 | A | 5/2018 |
| JP | 2018093109 | A | 6/2018 |
| WO | 2017061126 | A1 | 4/2017 |

OTHER PUBLICATIONS

Wang (Journal of Magnetism and Magnetic Materials, 474(2019)417-423). (Year: 2019).*

Machine translation of CN112750587A. May 4, 2021.*

Japanese Patent Office, Office Action Issued in Application No. 2021-110005, Dec. 17, 2024, 10 pages. (Submitted with Machine Translation).

* cited by examiner

PERMANENT MAGNET AND METHOD FOR MANUFACTURING THE SAME

CROSS-REFERENCE TO RELATED APPLICATION

The present application claims priority to Japanese Patent Application No. 2021-110005 filed on Jul. 1, 2021. The entire contents of the above-listed application is hereby incorporated by reference for all purposes.

BACKGROUND

The present disclosure relates to a permanent magnet and a method for manufacturing the same.

As rare-earth magnets, neodymium magnets, samarium cobalt magnets and the like have been known. Samarium cobalt magnets have excellent heat resistance and corrosion resistance, and also excellent magnetic characteristics. Therefore, samarium cobalt magnets are suitably used for applications requiring temperature stability, and various studies have been conducted on the samarium cobalt magnets (e.g., Japanese Unexamined Patent Application Publication Nos. 2018-93109 and 2018-85388).

Japanese Unexamined Patent Application Publication No. 2018-93109 discloses, as a permanent magnet having a good mechanical strength, a rare-earth cobalt-based permanent magnet including a base layer including a specific cell phase, and a surface oxide layer that covers the base layer.

Japanese Unexamined Patent Application Publication No. 2018-85388 discloses, as a permanent magnet for a rotary electric machine that performs variable speed drive, a permanent magnet including a crystal grain having a matrix and a grain boundary phase, in which Cu in the matrix has a specific concentration distribution.

SUMMARY

When permanent magnets are used, demagnetization adjustment may be performed on their magnetic forces. Specifically, the required magnetic force may vary depending on, for example, the applications of the permanent magnets and a combination with each component or the like. Therefore, the levels of demagnetization of the permanent magnets need to be adjusted depending on the application or the like thereof and their magnetic forces need to be adjusted to desired ones.

In order to stabilize magnetic characteristics of the permanent magnets, it is required that a demagnetization curve have a good squareness. On the other hand, permanent magnets with good squareness have a poor demagnetization response to demagnetization fields up to a knickpoint, and rapidly demagnetize for demagnetization fields above the knickpoint. Therefore, in these permanent magnets, it may be difficult to adjust the magnetic forces with high precision.

The present disclosure has been made to solve the above-described problem, and provides a permanent magnet in which demagnetization adjustment can be easily performed and a method for manufacturing the same.

A permanent magnet according to the present disclosure contains 22 to 28 mass % of a rare-earth element R, 12 to 23 mass % of Fe, 3 to 9 mass % of Cu, 1 to 4 mass % of Zr, and a remainder consisting of Co and unavoidable impurities, in which, in a demagnetization curve in which the horizontal axis indicates a demagnetization field (kOe) and the vertical axis indicates the total amount of magnetic flux ($\times10^{-5}$ WbT) in the permanent magnet, the slope of an approximate straight line in demagnetization field ranges from 0 to −11 kOe is 1.2 or smaller.

In one embodiment of the above-described permanent magnet, the coefficient of determination of the approximation curve is 0.90 or larger.

In one embodiment of the above-described permanent magnet, the permanent magnet contains 13 to 18 mass % of Fe.

In one embodiment of the above-described permanent magnet, the residual magnetization (Br) is 10.45 kG or less.

In one embodiment of the above-described permanent magnet, the squareness ratio is 90% or less.

In one embodiment of the above-described permanent magnet, in a demagnetization curve in which the horizontal axis indicates a demagnetization field (kOe) and the vertical axis indicates the total amount of magnetic flux ($\times10^{-5}$ WbT) in the permanent magnet, the slope of an approximate straight line in demagnetization field ranges from 0 to −13 kOe is 1.6 or less.

A method for manufacturing a permanent magnet according to the present disclosure is a method for manufacturing a permanent magnet, the method including:

preparing an alloy containing 22 to 28 mass % of a rare-earth element R, 12 to 23 mass % of Fe, 3 to 9 mass % of Cu, 1 to 4 mass % of Zr, and a remainder consisting of Co and unavoidable impurities; and pulverizing the alloy, molding the pulverized alloy, sintering the molded alloy, performing solution treatment on the sintered alloy, and performing aging treatment on the resulting alloy, in which the aging treatment is performed at 880 to 950 °C.

In one embodiment of the above-described method for manufacturing the permanent magnet, time for the aging treatment is 11 to 30 hours.

According to the present disclosure, a permanent magnet in which demagnetization adjustment can be easily performed and a method for manufacturing the same are provided.

The above and other objects, features and advantages of the present disclosure will become more fully understood from the detailed description given hereinbelow and the accompanying drawings which are given by way of illustration only, and thus are not to be considered as limiting the present disclosure.

DETAILED DESCRIPTION

Figure 1:
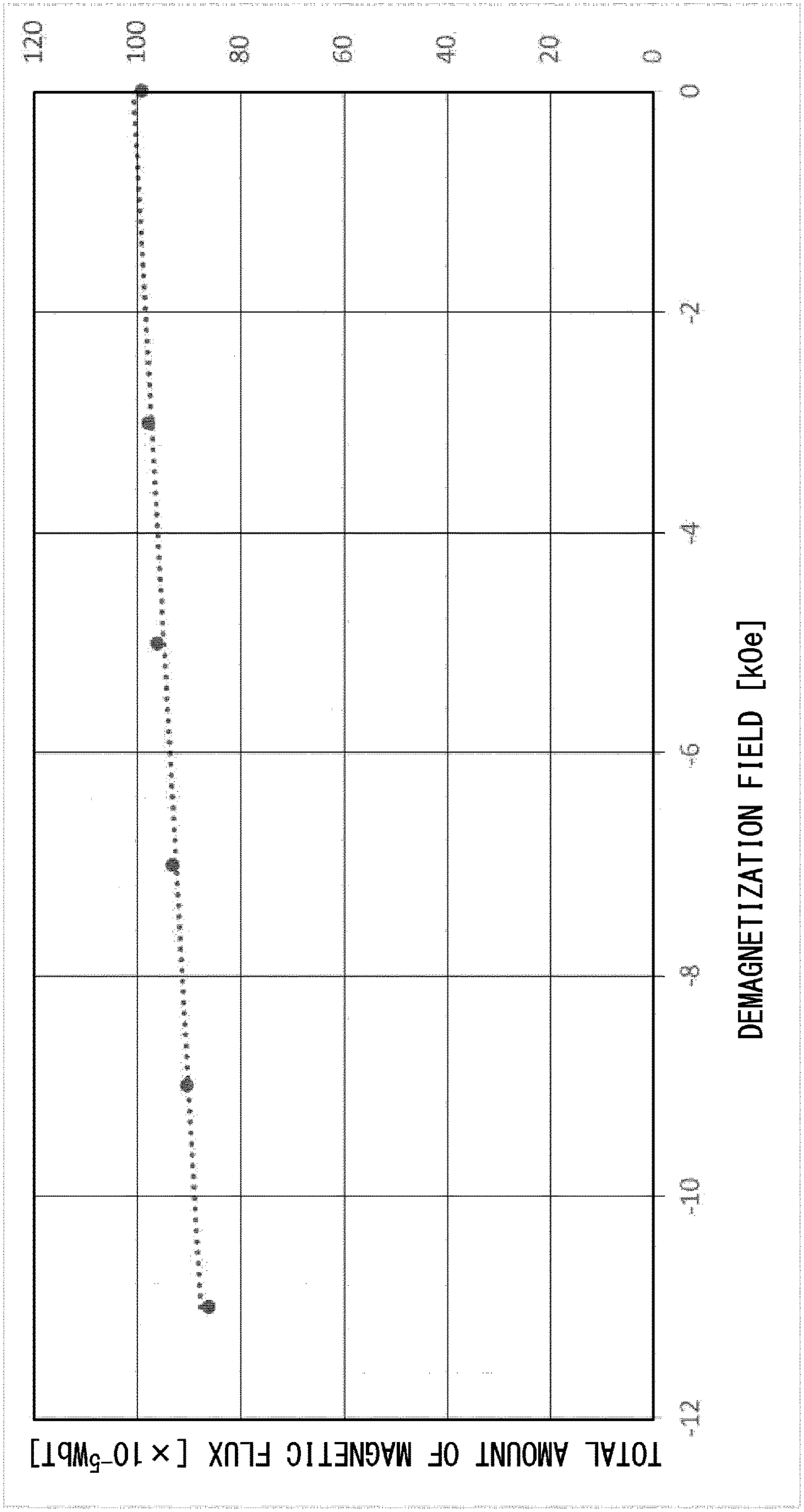
FIG. 1 is a graph showing demagnetization characteristics of a permanent magnet according to Example 1 and an approximate straight line.

Hereinafter, a permanent magnet according to the present disclosure will be described.

Note that a numerical range such as "n-m" or "n to m" (i.e., "from n to m") includes the lower and upper limit values, unless otherwise specified.

Permanent Magnet

A permanent magnet according to this embodiment (hereinafter also referred to as the permanent magnet according to the present disclosure or the like, or simply as the permanent magnet) contains 22 to 28 mass % of a rare-earth element R, 12 to 23 mass % of Fe, 3 to 9 mass % of Cu, 1 to 4 mass % of Zr, and a remainder consisting of Co and unavoidable impurities, in which, in a demagnetization curve in which the horizontal axis indicates a demagnetization field (kOe) and the vertical axis indicates the total amount of magnetic flux ($\times 10^{-5}$ WbT) in the permanent magnet, the slope of an approximate straight line in demagnetization field ranges from 0 to −11 kOe is 1.2 or smaller.

In the permanent magnet according to the present disclosure, in the demagnetization curve in which the horizontal axis indicates the demagnetization field (kOe) and the vertical axis indicates the total amount of magnetic flux ($\times 10^{-5}$ WbT) in the permanent magnet, the slope of the approximate straight line in the demagnetization field ranges from to −11 kOe is 1.2 or less, which means that the slope of demagnetization relative to the demagnetization field is small. Therefore, by adjusting the demagnetization field, demagnetization adjustment of the permanent magnet according to the present disclosure can be easily performed.

The permanent magnet according to the present disclosure is composed of 22 to 28 mass % of a rare-earth element R, 12 to 23 mass % of Fe, 3 to 9 mass % of Cu, 1 to 4 mass % of Zr, and a remainder consisting of Co and unavoidable impurities. The permanent magnet according to the present disclosure has the above composition, and as a result of processing by a manufacturing method that will be described later, a permanent magnet including a cell phase, which is a crystal phase (2-17 phase) having a $Th_2Zn_{17}$-type structure, a cell wall phase, which is a crystal phase (1-5 phase) having a CaCos-type structure, and a platelet phase can be obtained.

Since a magnetic domain wall energy of the cell wall phase is larger than that of the cell phase, it is estimated that the difference in the magnetic domain wall energies becomes a barrier to magnetic domain wall displacement, the cell wall phase acts as a pinning site, and thereby the coercive force is exerted. The cell wall phase is a phase existing at a boundary of the cell phase and it is considered that the difference in the magnetic domain wall energies between the cell phase and the cell wall phase is generated due to a difference in Cu concentrations. It is estimated that the coercive force is exerted when the Cu concentration of the cell wall phase is higher than the Cu concentration of the cell phase.

In the manufacturing method described later, by performing aging treatment at a high temperature of 880 °C or higher, it is estimated that the 1-5 phase occurs more frequently and that during this time a variation occurs in the difference in Cu concentrations. It is further estimated that, as a result, there is a variation in the magnitude of the coercive force as well. Since there is a variation in the magnitude of the coercive force, when the entire permanent magnet is taken into account, it is estimated that demagnetization relative to the demagnetization field responds relatively linearly.

The $Th_2Zn_{17}$-type structure is a crystal structure having an R-3m-type space group. In the permanent magnet according to the present disclosure, the Th part is typically occupied by a rare-earth element and Zr, and the Zn part is occupied by Co, Cu, Fe, and Zr. In this 1-5 phase, the Ca part is typically occupied by a rare-earth element and Zr and the Co part is typically occupied by Co, Cu, and Fe.

The rare-earth element R is a generic name of Sc, Y, and lanthanoids (elements with atomic numbers 57-71). The rare-earth element R may be one of the above-described elements alone or a combination of two or more elements. In order to achieve excellent magnetic characteristics, the rare-earth element R preferably includes Sm. Another rare-earth element used in combination with Sm is preferably Pr, Nd, Ce, or La in order to achieve excellent magnetic characteristics. Further, in order to achieve excellent magnetic characteristics, the rare-earth element R preferably contains Sm in 80 mass % or more, more preferably 90 mass % or more, and further preferably 95 mass % or more based on the whole rare-earth element R.

The permanent magnet according to the present disclosure contains 22 to 28% of the rare-earth element R. By containing the rare-earth element R in the aforementioned ratio, it is possible to obtain a permanent magnet having high magnetic anisotropy and a high coercive force and in which demagnetization adjustment can be easily performed. In order to achieve excellent magnetic characteristics and achieve demagnetization adjustment easily, the permanent magnet preferably contains 24 to 26.5% of the rare-earth element R.

The permanent magnet according to the present disclosure contains 12 to 23% of Fe. By containing 12% or more of Fe, the saturation magnetization is improved. Further, by limiting the content of Fe to 23% or less, a permanent magnet having a high coercive force can be obtained. The permanent magnet according to the present disclosure preferably contains 13 to 18% of Fe. By limiting the content of Fe to 18% or less, a permanent magnet in which demagnetization adjustment can be performed more easily can be obtained.

The permanent magnet according to the present disclosure contains 3 to 9% of Cu. By containing 3% or more of Cu, a permanent magnet having a high coercive force and in which demagnetization adjustment can be easily performed is obtained. Further, by limiting the content of Cu to 9% or less, the magnetization is prevented from decreasing. In order to improve the magnetic characteristics and make the demagnetization adjustment easier, the content of Cu is preferably 4 to 6%.

The permanent magnet according to the present disclosure contains 1 to 4% of Zr. By containing Zr in the aforementioned range, it is possible to obtain a permanent magnet having a high maximum energy product (BH) max which is a maximum magneto static energy that the magnet can hold. In order to improve the magnetic characteristics, the content of Zr is preferably 2 to 3.5%.

Further, the remainder (i.e., 38.5% to 49.3%) of the permanent magnet according to the present disclosure is consisting of Co (Cobalt) and unavoidable impurities. By containing Co, the thermal stability of the permanent magnet is improved. On the other hand, when the content of Co is too large, the content of Fe is relatively lowered.

The unavoidable impurities, which are elements unavoidably mixed in the permanent magnet from the raw materials or during the manufacturing process, include, for example, but not limited to, C, O, N, P, S, Al, Ti, Cr, Mn, Ni, Hf, Sn, and W. In the permanent magnet according to the present disclosure, the total containing ratio of unavoidable impurities is preferably 5 mass % or less, more preferably 1 mass % or less, still more preferably 0.1 mass % or less based on the total amount of the permanent magnet according to the present disclosure.

The content of each element in the permanent magnet according to the present disclosure may be measured by using, for example, Energy dispersive X-ray spectrometry (EDX).

Next, with reference to FIG. 1, a slope of an approximate straight line will be described. FIG. 1 is a graph showing demagnetization characteristics of the permanent magnet according to Example 1 and an approximate straight line.

The permanent magnet, which is the target to be measured, is firstly subjected to complete magnetization, and the total amount of magnetic flux after the complete magnetization is set as the total amount of magnetic flux where the demagnetization field corresponds to 0. Next, demagnetization fields are applied to measure the demagnetization fields and the total amount of magnetic flux that corresponds to each of the demagnetization fields, which are then plotted as shown in FIG. 1. In the example shown in FIG. 1, points when the demagnetization fields are 0, −3 kOe, −5 kOe, −7 kOe, −9 kOe, and −11 kOe are plotted (these plots may be referred to as a demagnetization curve). Note that the plots of the demagnetization curve are not limited to these values. By measuring the total amount of magnetic flux at each of five or more points including points where the demagnetization fields correspond to 0 and −11 kOe and linearly approximating these measured values by the least-squares method (this line may be referred to as an approximate straight line), the slope of the approximate straight line in the demagnetization field ranges from 0 to −11 kOe can be obtained.

An approximate straight line in demagnetization field ranges from 0 to −13 kOe can also be obtained by the above method by measuring the total amount of magnetic flux at each of five or more points, including the points where the demagnetization fields correspond to 0 and −13 kOe, although this line is not shown in FIG. 1.

Further, the coefficient of determination $r^2$ of the approximate straight line can be obtained by calculating the square of Pearson coefficient of correlation r (the following expression) from each plot.

$$r = \frac{\sum_i (x_i - \bar{x})^2 (y_i - \bar{y})^2}{\sqrt{\sum_i (x_i - \bar{x})^2 \sum_i (y_i - \bar{y})^2}}$$

where $x_i$ denotes each plot of the demagnetization field, $y_i$ denotes each plot of the total amount of magnetic flux $\bar{x}$ denotes an average of the demagnetization fields, and $\bar{y}$ denotes an average of the total amount of magnetic flux.

In the permanent magnet according to the present disclosure, the slope of the approximate straight line in the demagnetization field ranges from 0 to −11 kOe is 1.2 or smaller. Therefore, the slope of demagnetization is small, and it is easy to perform fine adjustment of demagnetization depending on the demagnetization fields. In order to perform adjustment of demagnetization more easily, the slope is preferably 1.15 or less, and more preferably 1.1 or less. Although it is sufficient that the lower limit value of the slope be larger than 0, the lower limit value of the slope is preferably 0.8 or larger in view of the demagnetization responsive property to the demagnetization field.

Further, in the permanent magnet according to the present disclosure, the coefficient of determination of the approximate straight line in the demagnetization field ranges from 0 to −11 kOe is preferably 0.90 or larger. The larger the coefficient of determination is, the more uniform the slope is, the more linear the response of demagnetization relative to the demagnetization field is, and the more easily demagnetization can be adjusted. In view of the above points, the coefficient of determination is preferably 0.91 or larger, and more preferably 0.92 or larger.

Further, in the permanent magnet according to the present disclosure, the slope in the demagnetization field ranges from 0 to −13 kOe is preferably 1.6 or less. Accordingly, it becomes easier to perform fine adjustment of demagnetization in a wide demagnetization field ranges from 0 to −13 kOe. In order to perform adjustment of demagnetization more easily, the slope is preferably 1.5 or less, and more preferably 1.3 or less. Although it is sufficient that the lower limit value of the slope be larger than 0, the lower limit value of the slope is preferably 0.8 or larger in view of the demagnetization responsive property relative to the demagnetization field.

The residual magnetization (Br) of the permanent magnet according to the present disclosure is preferably 10.45 kG or less, and more preferably 10.4 kG or less. By adjusting Br to 10.45 kG or less, the slope of the approximate straight line tends to be small, and thus a permanent magnet in which demagnetization adjustment can be easily performed can be obtained. On the other hand, in view of magnetic characteristics, the residual magnetization (Br) of the permanent magnet is preferably 10 kG or larger, and more preferably 10.2 kG or larger.

The coercive force (Hcb) of the permanent magnet according to the present disclosure is preferably 9.1 kOe or less, and more preferably 9 kOe or less. By adjusting Hcb to 9.1 kOe or less, the slope of the approximate straight line tends to be small, and thus a permanent magnet in which demagnetization adjustment can be easily performed can be obtained. On the other hand, in view of magnetic characteristics, the coercive force (Hcb) of the permanent magnet is preferably 8 kOe or larger, and more preferably 8.5 kOe or larger.

The coercive force (Hcj) of the permanent magnet according to the present disclosure is preferably 20 to 30 kOe, and more preferably 22 to 28 kOe so that demagnetization adjustment can be easily performed and excellent magnetic characteristics can be achieved.

The maximum energy product (BH) max of the permanent magnet according to the present disclosure is preferably 20 to 30 MGOe, and more preferably 22 to 28 MGOe so that demagnetization adjustment can be easily performed and excellent magnetic characteristics can be achieved.

Further, the squareness ratio of the permanent magnet according to the present disclosure is preferably 90% or less, and more preferably 86% or less. Since the squareness ratio is 90% or less, demagnetization adjustment can be performed more easily. While the lower limit value of the squareness ratio is not particularly limited, it may be, for example, 75% or larger, and preferably 80% or larger.

The above-described Br, Hcb, Hcj, and (BH) max of the permanent magnet can be obtained from results of measuring direct current magnetization characteristics at room temperature (25 °C) by using a Direct Current (DC) B-H tracer. Further, the squareness ratio can be obtained from the ratio of the (BH) max obtained by the measurement (the following expression (2)) to the theoretical maximum of the (BH) max, which is obtained from the following expression (1) using Br.

$$(BH)\max(\text{theoretical value})=Br^2/4\mu_0 \quad (1)$$

$$(BH)\max(\text{actually measured value})/(BH)\max(\text{theoretical value})\times100 \quad (2)$$

The permanent magnet according to the present disclosure has excellent heat resistance and corrosion resistance and excellent magnetic characteristics, and demagnetization adjustment can be easily performed. Therefore, the permanent magnet according to the present disclosure can be suitably used for various known applications. Examples of its application include clocks (watches), electric motors, various instruments, communication apparatuses, computer terminals, speakers, video discs, and sensors.

Method for Manufacturing Permanent Magnet

A method for manufacturing a permanent magnet according to this embodiment (hereinafter also referred to as the manufacturing method according to the present disclosure or the like, or simply as the manufacturing method) includes: preparing an alloy containing 22 to 28 mass % of a rare-earth element R, 12 to 23 mass % of Fe, 3 to 9 mass % of Cu, 1 to 4 mass % of Zr, and a remainder consisting of Co and unavoidable impurities; and pulverizing the alloy, molding the pulverized alloy, sintering the molded alloy, performing solution treatment on the sintered alloy, and performing aging treatment on the resulting alloy, in which the aging treatment is performed at 880 to 950 °C.

According to this manufacturing method, it is possible to suitably manufacture a permanent magnet according to the embodiment in which demagnetization adjustment can be easily performed. Each of the steps will be described hereinafter.

Firstly, an alloy consisting of 22 to 28 mass % of a rare-earth element R, 12 to 23 mass % of Fe, 3 to 9 mass % of Cu, 1 to 4 mass % of Zr, and a remainder consisting of Co and unavoidable impurities is prepared. The method for preparing the alloy may be prepared by obtaining a commercially-available alloy having a desired composition, or by blending the aforementioned elements so that a desired composition is obtained.

A specific example of the blending of the elements will be described hereinafter, but the present disclosure is not limited to this example method.

Firstly, a desired rare-earth element R, each of metal elements of Fe, Cu and Co, and a base alloy are prepared as ingredients. Note that it is preferable to select, as the base alloy, one having a composition having a low eutectic temperature because, by doing so, it is easy to make the composition of the obtained alloy uniform. In view of this point, FeZr or CuZr is preferably selected and used as the base alloy. As an example of FeZr, one containing about 20% of Fe and about 80% of Zr is suitable. Further, as an example of CuZr, one containing about 50% of Cu and 50% of Zr is suitable.

It is possible to obtain a homogeneous alloy by blending the aforementioned ingredients so as to have a desired composition, putting the blend in a crucible made of Al or the like, and dissolving the blend in a vacuum of $1\times10^{0.2}$ torr or lower, or in an inert-gas atmosphere by using a high-frequency melting furnace. Further, the present disclosure may include a step of casting the molten alloy by using a mold and thereby obtaining an alloy ingot. Alternatively, as a different method, a flaky alloy having a thickness of about 1 mm may be manufactured by dropping the molten alloy onto a copper roll (a strip casting method).

In the case of forming an alloy ingot by the above-described casting, the alloy ingot may be heat-treated at a solution-treatment temperature for 1 to 20 hours. By this heat treatment, the composition can be made more uniform. Note that the solution-treatment temperature for the alloy ingot may be adjusted as appropriate according to the composition and the like of the alloy.

Next, the alloy is pulverized. The method for pulverizing the alloy may be selected as appropriate from the known methods. As one example, first, the above alloy is coarsely pulverized by a known pulverizing machine such as a jaw crusher or a disc mill in an inert-gas atmosphere. If the pulverizability is poor, the alloy may be subjected to hydrogen storage treatment in advance. Hydrogen storage treatment embrittles the alloy and causes the alloy to be coarsely pulverized easily.

Next, the coarsely pulverized alloy is further pulverized finely. The fine pulverization may either be dry pulverization or wet pulverization. Dry pulverization may include, for example, a jet mill method. Further, the wet pulverization may include, for example, a wet ball-mill method. A lubricant may be added to lubricate the powder during pulverization. Further, the mixture of the organic solvent after the pulverization with the fine powder is dried in inert gas. The average particle diameter after the fine pulverization is preferably 1 to 10 μm so that a sintering time in a sintering step (which will be described later) can be shortened and homogenous permanent magnets can be manufactured.

Next, the obtained powder is molded into a desired shape to obtain a molded body. The obtained powder is preferably pressure-molded in a constant magnetic field in order to align the orientation of crystals and thereby to improve the magnetic characteristic. There is no particular restriction on the relation between the direction of the magnetic field and the pressing direction, and the relation may be selected as appropriate according to the shape and the like of the product. For example, when a ring magnet or a thin plate-like magnet is manufactured, it is possible to use parallel magnetic-field pressing in which a magnetic field is applied in a direction parallel to the pressing direction. On the other hand, in order to achieve excellent magnetic characteristics, it is preferable to use right-angle magnetic-field pressing in which a magnetic field is applied at a right angle with respect to the pressing direction.

The magnitude of the magnetic field is not limited to any particular value, and the magnetic field may be, for example, a magnetic field of 15 kOe or weaker, or a magnetic field of 15 kOe or larger depending on the use and the like of the product. However, in order to achieve excellent magnetic characteristics, it is preferable to perform the pressure-molding in a magnetic field of 15 kOe or larger. Further, the pressure in the pressure molding may be adjusted as appropriate according to the size, the shape, and the like of the product. As an example, the pressure may be 0.5 to 2.0 ton/cm$^2$. That is, in the method for manufacturing a rare-earth cobalt permanent magnet according to the present disclosure, in order to achieve excellent magnetic characteristics, it is particularly preferable that the powder be press-molded in a magnetic field of 15 kOe or larger while applying a pressure of no lower than 0.5 ton/cm$^2$ and no higher than 2.0 ton/cm$^2$ perpendicularly to the magnetic field.

Next, the obtained molded body is sintered to obtain a sintered body. The sintering temperature is preferably 1,180 to 1,220 °C, and more preferably 1,190 to 1,220 °C. Further, the sintering time is preferably 20 to 240 minutes, and more preferably 60 to 180 minutes. By sintering the molded body at 1,180 °C or higher for 20 minutes or longer, the sintered body is sufficiently densified. Further, by adjusting the heating temperature to 1,220 °C or lower and the heating time to 240 minutes or less, the rare-earth elements, particularly Sm, are prevented from evaporating. Further, in order to prevent the oxidation, the above-described sintering step is preferably performed in a vacuum of 1,000 Pa or lower, or in an inert-gas atmosphere. Further, in order to increase the density of the sintered body, the above-described sintering step is preferably performed in a vacuum of 1,000 Pa or lower, and more preferably in a vacuum of 100 Pa or lower.

The obtained sintered body is preferably subjected to solution treatment after it is sintered. By performing solution treatment on the obtained sintered body, the composition of the molded body can be made uniform and a crystal phase (1-7 phase) having a $TbCu_7$-type structure is formed. In the 1-7 phase, the Tb part is typically occupied by a rare-earth element R and Zr and the Cu part is occupied by Co, Cu, and Fe.

In order to obtain a permanent magnet in which demagnetization adjustment can be easily performed, the solution treatment is preferably performed at 1,050 to 1,190 °C, more preferably 1,100 to 1,170 °C, and further preferably 1,130 to 1,170 °C. Further, by performing heat treatment at 1,050 °C or higher, the composition can be made uniform and the formation of the 1-7 phase is promoted. On the other hand, by performing heat treatment at 1,190 °C or lower, the rare-earth elements are prevented from evaporating. Further, the time for the solution treatment may be, for example, 1 to 100 hours, preferably 1.5 to 50 hours. In order to prevent the oxidation, the above-described solution treatment is preferably performed in a vacuum of $1\times10^{-2}$ torr or lower or in an inert-gas atmosphere.

Next, aging treatment is performed. The sintered body after the solution treatment having the 1-7 phase is subjected to aging treatment so that nano-scale phase separation occurs and the cell phase, which is the 2-17 phase cell, the cell wall phase, which is the 1-5 phase, and the platelet phase are formed. According to this manufacturing method, the sintered body after the solution treatment having the above-described composition is subjected to aging treatment at 880 to 950 °C, whereby a permanent magnet whose slope of the approximate straight line is 1.6 or less can be obtained. By performing aging treatment at a relatively high temperature of 880 °C or higher, there occurs a variation in the magnitude of the coercive force (the distribution of the coercive force becomes broad). As a result, when the entire permanent magnet is taken into account, it is estimated that demagnetization relative to the demagnetization field responds relatively linearly. In particular, the aging treatment temperature is preferably 880 to 920 °C. In order to make the slope of the approximate straight line smaller, the time for the aging treatment is preferably 11 to 30 hours, and more preferably 13 to 18 hours. Further, in order to prevent the oxidation, the above-described aging treatment is preferably performed in a vacuum of $1\times10^{-2}$ torr or lower or in an inert-gas atmosphere.

The sintered body after the aging treatment is normally cooled. Although the cooling method is not particularly limited, in order to obtain excellent magnetic characteristics, the cooling rate is preferably adjusted to 2 °C/min or lower, and more preferably 0.5 °C/min or lower until the sintered body is cooled to at least 400 °C, preferably 300 °C.

According to the above-described method, it is possible to obtain a permanent magnet in which, in the demagnetization curve in which the horizontal axis indicates the demagnetization field (kOe) and the vertical axis indicates the total amount of magnetic flux ($\times10^{-5}$ WbT) in the permanent magnet, the slope of the approximate straight line in the demagnetization field ranges from 0 to −13 kOe is 1.6 or less.

EXAMPLE

The present disclosure will be described hereinafter in a concrete manner with reference to examples and comparative examples. Note that the present disclosure is not limited by the descriptions of examples below.

Example 1

After various raw materials were weighted to have a composition (mass ratio) of Fe 15%, Cu 4.5%, Zr 3%, Sm 25%, a remainder Co, they were melt in an argon gas atmosphere after evacuation to produce an alloy ingot. This ingot was coarsely pulverized and further pulverized finely with a jet mill with an average diameter of 5 μm. The obtained powder was press-molded in a magnetic field of 1.5 T at a press pressure of about 1 ton/$cm^2$ to produce a compressed powder body. Next, the compressed powder body was heated to 1,220 °C in an argon gas atmosphere at a heating rate of 7 °C/min at a firing furnace, sintering was performed by retaining the compressed powder body at this temperature for two hours, then cooled to 1,110 °C at a cooling rate of 5 °C/min, subsequently the solution treatment was performed by retaining it at 1,110 °C for four hours. The sintered body after the solution treatment was subjected to aging treatment while retaining it at 900 °C for 14 hours in an argon gas atmosphere, then gradually cooled to 300 °C at a cooling rate of −0.5 °C/min, and further cooled to a room temperature, whereby a permanent magnet according to Example 1 was obtained.

Comparative Examples 1 and 2

Permanent magnets according to Comparative Examples 1 and 2 were obtained by a method similar to that in Example 1 except that the aging treatment temperature was changed to 870 °C. (Comparative Example 1) and to 835 °C. (Comparative Example 2) in the above-described Example 1.

Example 2

A permanent magnet according to Example 2 was obtained by a method similar to that in Example 1 except that the solution treatment temperature was changed to 1,140 °C in Example 1.

Comparative Examples 3 and 4

Permanent magnets according to Comparative Examples 3 and 4 were obtained by a method similar to that in Example 2 except that the aging treatment temperature was changed to 870 °C. (Comparative Example 3) and to 835 °C. (Comparative Example 4) in the above-described Example 2.

Example 3

A permanent magnet according to Example 3 was obtained by a method similar to that in Example 1 except that the solution treatment temperature was changed to 1,170 °C in Example 3.

Comparative Examples 5 and 6

Permanent magnets according to Comparative Examples 5 and 6 were obtained by a method similar to that according to Example 3 except that the aging treatment temperature was changed to 870 °C. (Comparative Example 5) and to 835 °C. (Comparative Example 6) in the above-described Example 3.

EVALUATIONS

Each of the permanent magnets obtained in the above-described Examples and Comparative Examples was processed into a size of 6×2×0.5 mm (the magnetization direction is the direction with the size of 0.5 mm). The residual magnetization (Br), the retaining force (Hcb), the retaining force (Hcj), and the maximum energy product (BH) max of each permanent magnet were measured to calculate the (BH) max (theoretical value) and the squareness ratio. Table 1 shows the results of the measurement.

Further, each of the above-described permanent magnets was subjected to complete magnetization in a magnetic field of 5 T, and the total amount of magnetic flux after the complete magnetization (the demagnetization field corresponds to 0) was measured. Next, demagnetization fields of −3 kOe, −5 kOe, −7 kOe, −9 kOe, −11 kOe, and −13 kOe were applied to measure each demagnetization field and the total amount of magnetic flux that corresponds to each demagnetization field.

An approximate straight line (A) and a coefficient of determination $r^2$ in a range from 0 to −11 kOe were obtained from measured values when the demagnetization fields were 0, −3 kOe, −5 kOe, −7 kOe, −9 kOe, and −11 kOe using a least-squares method.

Figure 2:
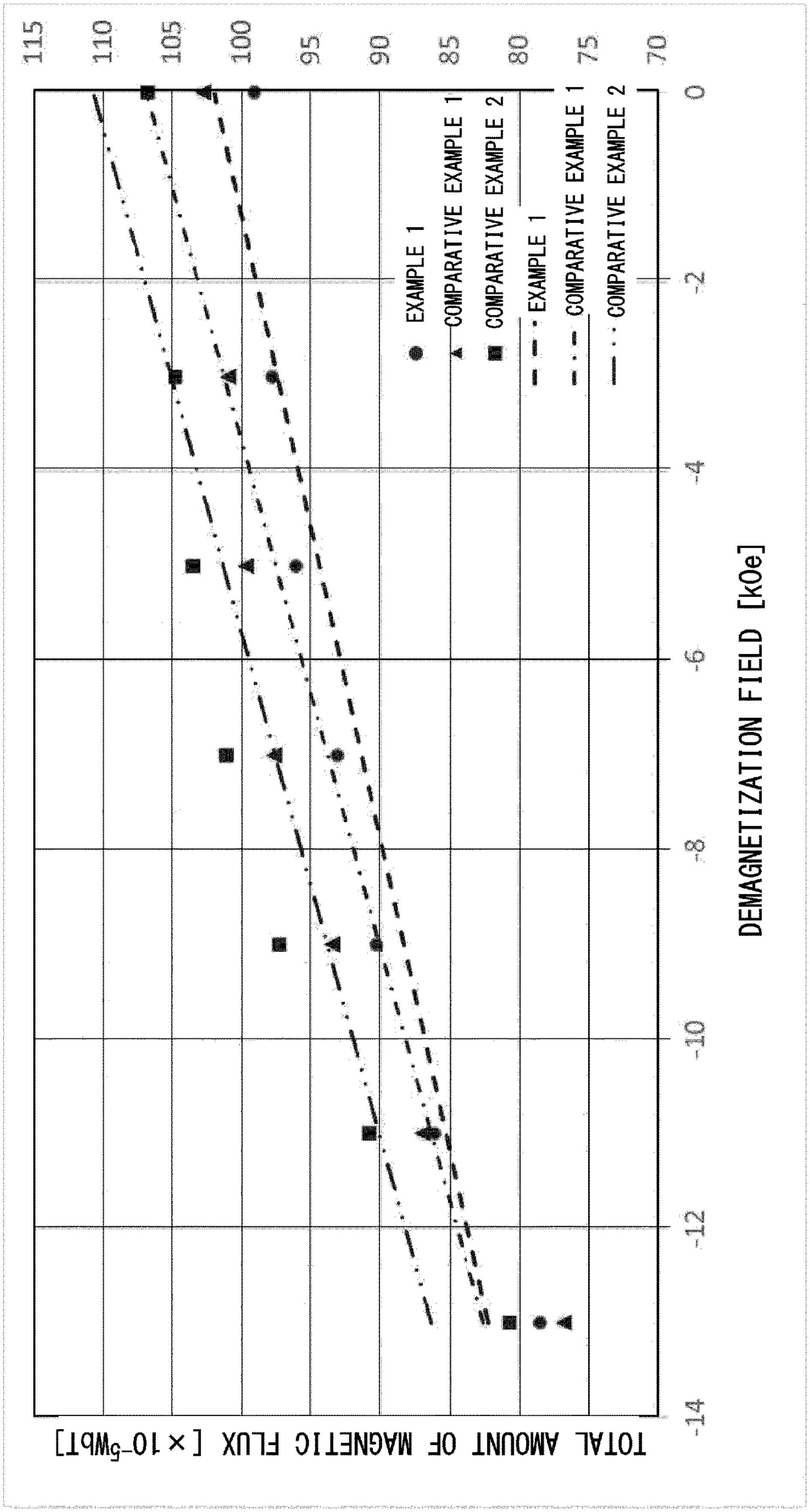
FIG. 2 is a graph showing demagnetization characteristics of permanent magnets according to Example 1 and Comparative Examples 1 and 2.
Figure 3:
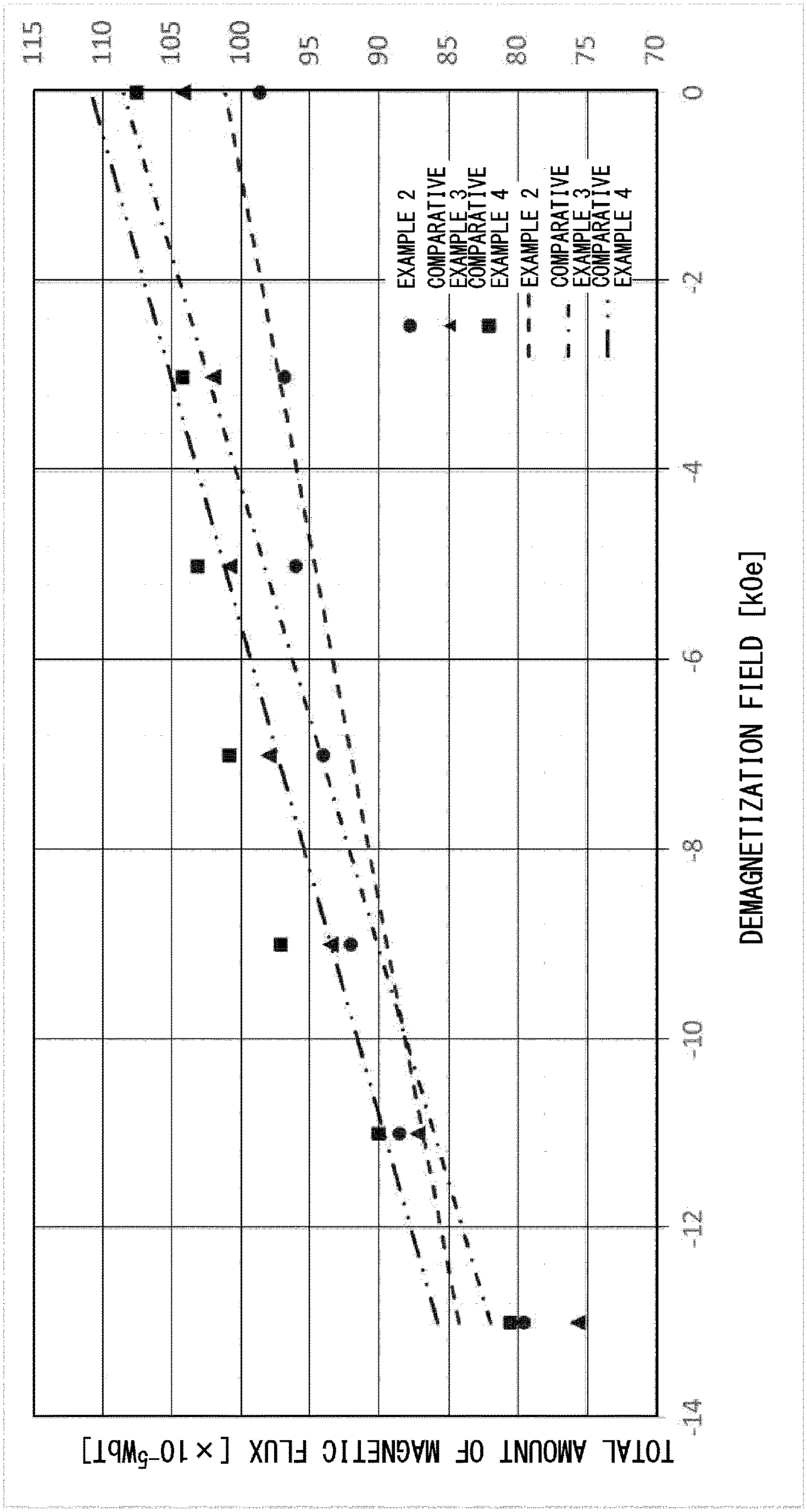
FIG. 3 is a graph showing demagnetization characteristics of permanent magnets according to Example 2 and Comparative Examples 3 and 4.
Figure 4:
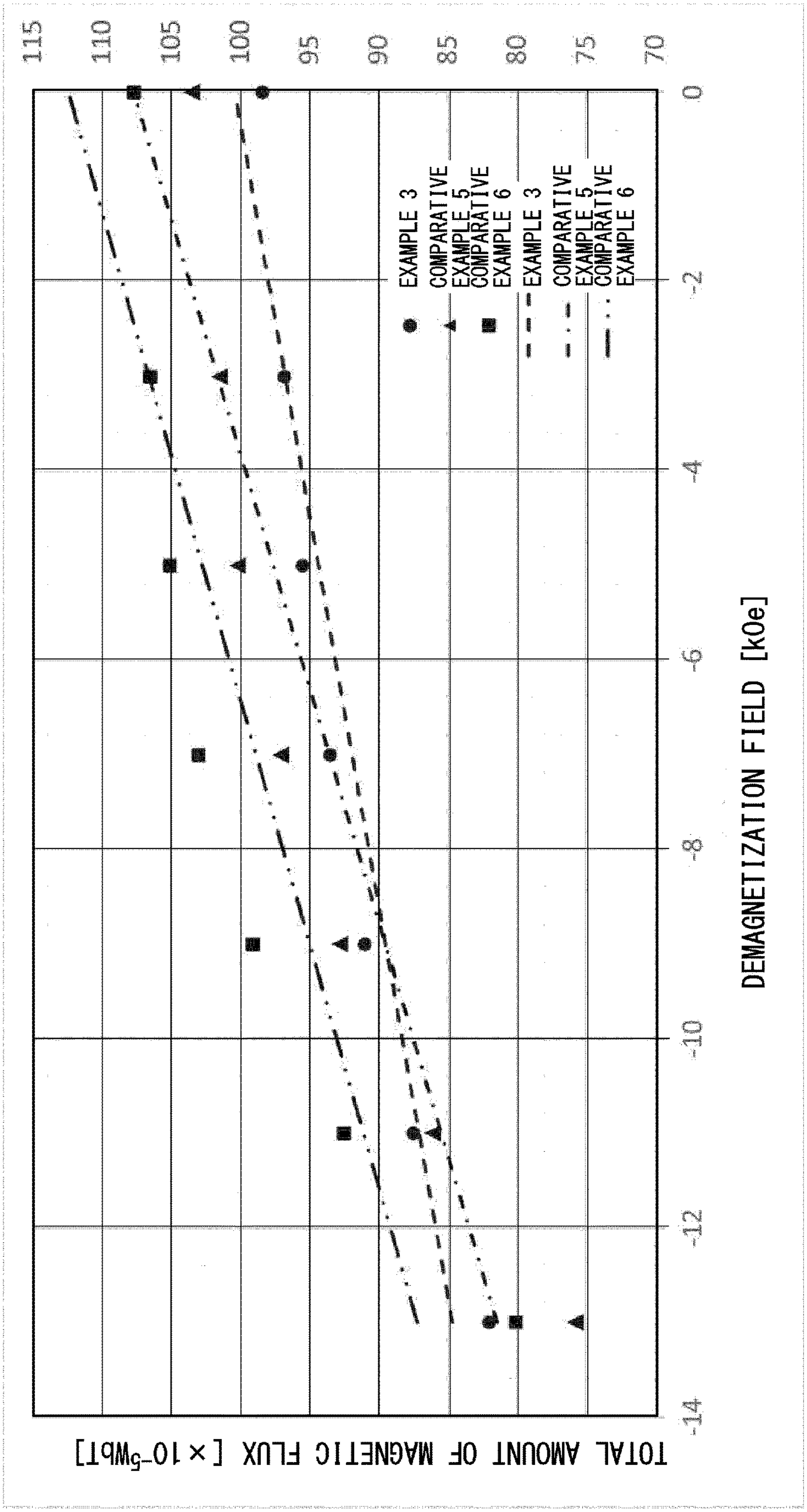
FIG. 4 is a graph showing demagnetization characteristics of permanent magnets according to Example 3 and Comparative Examples 5 and 6.

Further, the slope of an approximate straight line (B) in the range from 0 to −13 kOe was obtained from the measured values when the demagnetization fields were 0, −3 kOe, −5 kOe, −7 kOe, −9 kOe, −11 kOe, and −13 kOe. The results are shown in Table 1 and FIGS. 2 to 4.

TABLE 1

| | Solutionizing temperature [° C.] | Aging temperature [° C.] | Br [kG] | Hcb [kOe] | (BH) max [MGOe] | Hcj [kOe] | (BH) max (Theoretical value) | Squareness ratio | Total amount of magnetic flux relative to demagnetization field [× 1 0$^{-5}$ W b T] After complete manetization | After demag-netization of −3kOe | After demag-netization of −5kOe |
|---|---|---|---|---|---|---|---|---|---|---|---|
| Example 1 | 1110 | 900 | 10.39 | 8.84 | 23.19 | 23.21 | 26.99 | 0.86 | 99.1 | 97.8 | 96.1 |
| Comparative Example 1 | | 870 | 10.43 | 9.17 | 24.13 | 26.08 | 27.20 | 0.89 | 102.8 | 101.0 | 99.7 |
| Comparative Example 2 | | 835 | 10.40 | 9.51 | 25.10 | 23.38 | 27.04 | 0.93 | 106.8 | 104.8 | 103.5 |
| Example 2 | 1140 | 900 | 10.39 | 8.86 | 22.96 | 25.36 | 26.99 | 0.85 | 98.6 | 96.8 | 96.0 |
| Comparative Example 3 | | 870 | 10.47 | 9.37 | 24.84 | 25.61 | 27.41 | 0.91 | 104.2 | 102.0 | 100.8 |
| Comparative Example 4 | | 835 | 10.47 | 9.53 | 25.30 | 23.30 | 27.41 | 0.92 | 107.5 | 104.2 | 103.1 |
| Example 3 | 1170 | 900 | 10.34 | 8.82 | 22.65 | 27.61 | 26.73 | 0.85 | 98.4 | 96.8 | 95.5 |
| Comparative Example 5 | | 870 | 10.47 | 9.29 | 24.44 | 25.73 | 27.41 | 0.89 | 103.5 | 101.5 | 100.2 |
| Comparative Example 6 | | 835 | 10.50 | 9.62 | 25.60 | 25.27 | 27.56 | 0.93 | 107.7 | 106.5 | 105.1 |

| | Total amount of magnetic flux relative to demagnetization field [× 1 0$^{-5}$ W b T] After demag-netization of −7kOe | After demag-netization of −9kOe | After demag-netization of −11kOe | After demag-netization of −13kOe | Approximate straight line (A) Slope | Intercept | Coefficient of determination $r^2$ | Approximate stright line Slope |
|---|---|---|---|---|---|---|---|---|
| Example 1 | 93.1 | 90.3 | 86.1 | 78.5 | 1.19 | 100.67 | 0.9363 | 1.51 |
| Comparative Example 1 | 97.7 | 93.5 | 87.0 | 76.8 | 1.35 | 104.84 | 0.8719 | 1.87 |
| Comparative Example 2 | 101.1 | 97.3 | 90.8 | 80.7 | 1.37 | 108.73 | 0.8880 | 1.87 |
| Example 2 | 94.0 | 92.0 | 88.5 | 79.5 | 0.88 | 99.45 | 0.9405 | 1.30 |
| Comparative Example 3 | 98.0 | 93.5 | 87.2 | 75.6 | 1.48 | 106.27 | 0.8967 | 2.04 |
| Comparative Example 4 | 100.8 | 97.1 | 90.0 | 80.5 | 1.46 | 108.98 | 0.9026 | 1.93 |
| Example 3 | 93.5 | 91.0 | 87.5 | 82.0 | 0.97 | 99.45 | 0.9454 | 1.21 |
| Comparative Example 5 | 97.1 | 92.8 | 86.1 | 75.8 | 1.52 | 105.73 | 0.8927 | 2.03 |
| Comparative Example 6 | 103.0 | 99.1 | 92.5 | 80.1 | 1.31 | 109.94 | 0.8560 | 1.94 |

As shown in Table 1, it has been found that, in the permanent magnets according to Examples 1 to 3 obtained by the manufacturing method according to the present disclosure, in a demagnetization curve in which the horizontal axis indicates the demagnetization field (kOe) and the vertical axis indicates the total amount of magnetic flux ($\times 10^{-5}$ WbT) in the permanent magnet, the slope of the approximate straight line in demagnetization field ranges from 0 to −11 kOe was 1.2 or less, the coefficient of determination was 0.90 or larger, and demagnetization adjustment was easily performed.

While the present disclosure has been described along the above-described embodiments, the present disclosure is not limited to the configurations described in the above-described embodiments and naturally includes various modifications, corrections, and combinations that those skilled in the art can make within the scope of the present disclosure.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the present disclosure.

The invention claimed is:

1. A permanent magnet containing 24 to 25 mass % of a rare-earth element R, 12 to 23 mass % of Fe, 3 to 9 mass % of Cu, 1 to 4 mass % of Zr, and a remainder being Co and unavoidable impurities, wherein, in a demagnetization curve in which the horizontal axis indicates a demagnetization field (kOe) and the vertical axis indicates a total amount of magnetic flux ($\times 10^{-5}$ Wb) in the permanent magnet, the slope of an approximate straight line in demagnetization field ranges from 0 to −11 kOe is 0.8 to 1.2, a residual magnetization (Br) is 10.2 kG<Br<10.39 KG, a squareness ratio, which is defined as follows, is 86% or less, the slope of the approximate straight line in the demagnetization field ranges from 0 to −11 kOe is obtained by following: the total amount of magnetic flux after the complete magnetization is set as the total amount of magnetic flux where the demagnetization field corresponds to 0, next, demagnetization fields are applied to measure the demagnetization fields and the total amount of magnetic flux that corresponds to each of the demagnetization fields, and then, by measuring the total amount of magnetic flux at each of five or more points including points where the demagnetization fields correspond to 0 and −11 kOe and linearly approximating these measured values by the least-squares method, the squareness ratio is obtained from the ratio of the (BH) max obtained by the measurement (the following expression (2)) to the theoretical maximum of the (BH)max, which is obtained from the following expression (1) using Br:

$$(BH)\text{max(theoretical value)}=Br^2/4\mu_0 \quad (1)$$

$$(BH)\text{max(actually measured value)}/(BH)\text{max(theoretical value)}\times 100 \quad (2)$$

in expression (1), $\mu_0$ is the magnetic constant, in the demagnetization curve in which the horizontal axis indicates the demagnetization field (kOe) and the vertical axis indicates the total amount of magnetic flux ($\times 10^{-5}$ Wb) in the permanent magnet, the slope of the approximate straight line in demagnetization field ranges from 0 to −13 kOe is 1.6 or less, the slope of the approximate straight line in the demagnetization field ranges from 0 to −13 kOe is obtained by following: the total amount of magnetic flux after the complete magnetization is set as the total amount of magnetic flux where the demagnetization field corresponds to 0, next, demagnetization fields are applied to measure the demagnetization fields and the total amount of magnetic flux that corresponds to each of the demagnetization fields, and then, by measuring the total amount of magnetic flux at each of five or more points including points where the demagnetization fields correspond to 0 and −13 kOe and linearly approximating these measured values by the least-squares method.

2. The permanent magnet according to claim 1, wherein a coefficient of determination of the approximate straight line is 0.90 or larger, the coefficient of determination $r^2$ of the approximate straight line is obtained by calculating the square of Pearson coefficient of correlation r from each plot, where correlation r is the following expression:

$$r=\frac{\sum_i (x_i-\bar{x})^2 (y_i-\bar{y})^2}{\sqrt{\sum_i (x_i-\bar{x})^2 \sum_i (y_i-\bar{y})^2}}$$

where $x_i$ denotes each plot of the demagnetization field, $y_i$ denotes each plot of the total amount of magnetic flux, $\bar{x}$ denotes an average of the demagnetization fields, and $\bar{y}$ denotes an average of the total amount of magnetic flux.

3. The permanent magnet according to claim 1, containing 13 to 18 mass % of Fe.

4. A method for manufacturing the permanent magnet according to claim 1, the method comprising:

preparing an alloy having composition as recited in claim 1; and pulverizing the alloy, molding the pulverized alloy, sintering the molded alloy, performing solution treatment on the sintered alloy, and finally performing aging treatment on the resulting alloy, wherein the aging treatment is performed at 880 to 950 °C.

5. The method for manufacturing the permanent magnet according to claim 4, wherein time for the aging treatment is 11 to 30 hours.

* * * * *